United States Patent [19]

Appleby

[11] Patent Number: 4,859,292
[45] Date of Patent: Aug. 22, 1989

[54] METHOD AND APPARATUS FOR H$_2$S ELECTROLYSIS

[75] Inventor: Anthony J. Appleby, Bryan, Tex.
[73] Assignee: The Texas A & M University System, College Station, Tex.
[21] Appl. No.: 174,215
[22] Filed: Mar. 28, 1988
[51] Int. Cl.$^4$ ............................ C25B 1/02; C25C 3/00
[52] U.S. Cl. .................................. 204/60; 204/243 R; 204/282; 204/283; 204/292; 204/293; 204/294; 204/295
[58] Field of Search ............... 204/60, 61, 243 R, 244, 204/294, 291, 292, 293, 295, 282-283, 265, 263, 129, 128; 429/16, 41, 44, 46

[56] References Cited

U.S. PATENT DOCUMENTS

| | | |
|---|---|---|
| 1,891,974 | 12/1932 | Fischer . |
| 3,401,101 | 9/1968 | Keller, Jr. ............................ 204/136 |
| 3,409,520 | 11/1968 | Bolmer ................................. 204/101 |
| 4,115,627 | 9/1978 | Christner et al. ...................... 429/44 |
| 4,218,342 | 8/1980 | Thompson ............................ 252/431 |
| 4,554,225 | 11/1985 | Sounai et al. ........................... 429/16 |

FOREIGN PATENT DOCUMENTS 0087775  5/1983  Japan ...................................... 429/44

OTHER PUBLICATIONS

Arendt, "A Hernate Matrix Material for Molten Carbonate Fuel Cell Electrolyte Structures", May 1982, 979–983, J. Elect. Chem. Soc., vol. 129 #5.
Bartlett et al., "Preliminary Evaluation of Process of Recovering Hydrogen from Hydrogen Sulfide", Jet Propulsion Laboratory, C.I.T., Jul. 1979.
International Journal of Hydrogen Energy, vol. 12, No. 6, 1987.
Weaver et al., "Electrochemical Removal of H$_2$S from Hot Gas Streams", J. Electrochem. Soc.: Electrochemical Science and Technology, Oct. 1987.
Gregory et al.,"Electrolysis of Liquid Hydrogen Sulphide", Journal of Applied Electrochemistry (vol. 10, No. 3), May, 1980.
Borgarello et al., "Visible Light Induced Generation of Hydrogen from H$_2$S in CdS-Dispersions, Hole Transfer Catalysis by RuO$_2$", Helvetica Chimica Acta (vol. 65, Fasc. 1), 1982.

Primary Examiner—John F. Niebling
Assistant Examiner—Kathryn Gorgos

[57] ABSTRACT

A method and apparatus for refining elemental sulphur and hydrogen gas from H$_2$S is disclosed. More specifically, the present invention relates to a method and apparatus for vapor phase electrolysis of H$_2$S gas using a molten polysulfide electrolyte disposed in a matrix.

30 Claims, 2 Drawing Sheets

METHOD AND APPARATUS FOR H₂S ELECTROLYSIS

BACKGROUND

1. Field of the Invention

The present invention relates generally to a method and apparatus for refining elemental sulfur and hydrogen gas from gaseous H₂S. More specifically, the present invention relates to a method and apparatus for vapor phase electrolysis of H₂S gas using a polysulfide electrolyte disposed in a matrix.

2. Description of the Prior Art

Hydrogen sulfide is present as a contaminant in many valuable fluids. For example, in the petroleum industry, hydrogen sulfide is a commonly found contaminant in production fluids such as oil and gas, and in processing and product streams attendant to the refining of such production fluids. Perhaps the most troublesome occurrence of hydrogen sulfide is its presence in gaseous hydrocarbon mixtures produced from subterranean formations, either separately or concomitantly with liquid petroleum. Such gaseous hydrocarbon mixtures, commonly termed "natural gas", are usually comprised predominantly of methane and ethane with trace amounts of hydrocarbon vapors such as propane, butane, pentane, etc.

Because of its highly corrosive nature, as well as for other reasons, it is usually necessary or at least preferable to remove hydrogen sulfide when it occurs in admixture with hydrocarbons. Also, where a market exists for certain materials of which hydrogen sulfide is a precursor, it usually will be advantageous for economic reasons to obtain, if possible, such materials as by-products of the hydrogen sulfide-hydrocarbon gas separation process.

A process widely accepted for the decomposition of hydrogen sulfide derived from contaminated natural gas wells, or alternately, from the desulfurization of petroleum at oil refineries, is the Claus process. The Claus process involves complete combustion of one third of the hydrogen sulfide to sulfur dioxide:

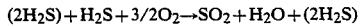

$$(2H_2S) + H_2S + 3/2O_2 \rightarrow SO_2 + H_2O + (2H_2S)$$

This is followed by reaction of the SO₂ produced with the remaining H₂S at 700° F.:

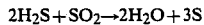

$$2H_2S + SO_2 \rightarrow 2H_2O + 3S$$

The yield of sulfur is about 98.5% efficient and thus a tail-gas clean-up unit is required which substantially increases cost. The minimum size of a Claus unit is about 10 tons of sulfur per day.

Another process under development is termed the Lo Cat process. The Lo Cat process is based on the use of the ferrous/ferric redox couple which oxidizes H₂S, yielding a sulfur end product. The reduced ferrous species is regenerated to ferric by atmospheric oxygen. While the Claus process is a high temperature gas-phase based process, the Lo Cat process is aqueous based and operates at low temperatures.

Disadvantages of both of these processes involve the resultant end products, since both processes yield only elemental sulfur. The hydrogen that is contained in the hydrogen sulfide is lost either in the form of water or gaseous steam. Thus, the economic efficiency of both the Claus and the Lo Cat process depends solely on the marketability of the sulfur end product.

A number of electrochemical approaches have been proposed for the decomposition of hydrogen sulfide where said decomposition yields both hydrogen gas and elemental sulfur. Almost all of these electrochemical approaches involve the use of aqueous based electrolytes and consist of both "direct" and "indirect" methods of electrochemical decomposition.

In one direct method of electrochemical decomposition, hydrogen sulfide gas is fed directly into the electrochemical cell with the electrolyte where electrochemical reactions take place. These reactions produce hydrogen gas at the cell cathode, and elemental sulfur at the anode. The major difficulty encountered with such direct electrochemical approaches using aqueous electrolytes is that the elemental sulfur generated at the anode "poisons" or deactivates the anode surface, thus precluding further electrochemical reactions from taking place. Further, the elemental sulfur produced in these and similar direct reactions is insoluble in water and thus precipitates over the internal surface of the anolyte chamber of the electrochemical cell.

Generally, in indirect electrochemical approaches a redox couple such as iodide/iodine is employed in the electrochemical cell using an aqueous solvent. The iodine produced as a result of the electrochemical process is subsequently reacted in another reactor vessel with the hydrogen sulfide gas, generating elemental sulfur, protons, and iodide ions. The iodide ions and protons are returned to the electrochemical cell, resulting in the regeneration of iodide as well as the liberation of hydrogen gas. The shuttling of iodide and iodine back and forth between the electrochemical cell and the decomposition reactor is utilized in the breakdown of hydrogen sulfide.

One of the major problems encountered with this and similar indirect approaches is that the sulfur produced in the reactor exists in a sticky plastic form. This form of sulfur must then be dissolved and recrystallized from an organic solvent, e.g., toluene, in order to reduce the sulfur to a soluble form. These additional steps of dissolution and recrystallization are both time and space intensive, thus resulting in an overall loss of system efficiency.

SUMMARY OF THE INVENTION

The present invention addresses the aforedescribed and other disadvantages of prior art methods of decomposing H₂S gas by providing an economic electrochemical process whereby H₂S is decomposed into soluble forms of elemental sulfur and hydrogen gas.

A general embodiment of the present invention utilizes an electrochemical cell where a sodium polysulfide molten salt functions as the electrolyte. The anode of the cell is based on technology common in the sodium sulfur-beta alumina battery art, while the cathode is modeled indirectly on a molten carbonate fuel cell.

In a preferred embodiment of the present invention, a mixed sodium polysulfide electrolyte is disposed in a layered matrix of lithium aluminate or other suitable stable matrix material such as alumina or magnesia. This electrolytic layer is contacted on one side by a porous graphite anode and on the other side by a porous nickel cathode such as to form an electrolytic cell. Hydrogen sulfide gas passed through the cathode into the electrolyte while an electrical potential is applied across the anode and cathode, yields a flow of hydrogen ions at the cathode and sulfur ions at the anode. In operation, the porous nickel cathode becomes coated with sulfide, which acts as a catalyst.

The present invention has many advantages over the art. One advantage of the present device is its ability to be readily scaled up or down to any required size. In this connection, the present device has significant utility in such applications where relatively low quantity sulphur removal is required, e.g., at an individual wellhead.

The overall voltage of the present process is only about 0.22 V at open circuit under conditions where the hydrogen and hydrogen sulfide partial pressures are equal. Under load at practical current densities, for example, 150 mA/cm$^2$, ohmic and other losses are small. Hence, only a fraction of the electricity required in aqueous electrolysis processes is needed to decompose $H_2S$ into its constituent elements.

Further, the present process yields both hydrogen and sulphur end products, which results in significant economic savings. In the Claus process, the attainable heat of hydrogen combustion is wasted. This is to be compared with the present process in which its heat is retained and in energy terms is worth up to six times the energy consumed. Alternatively, the gained hydrogen can be oxidized in a fuel cell yielding typically 0.7 V so that more than twice the electricity can be produced in a fuel cell as is consumed in the electrolyzer.

DETAILED DESCRIPTION OF THE PREFERRED EMBODIMENT

Figure 1:
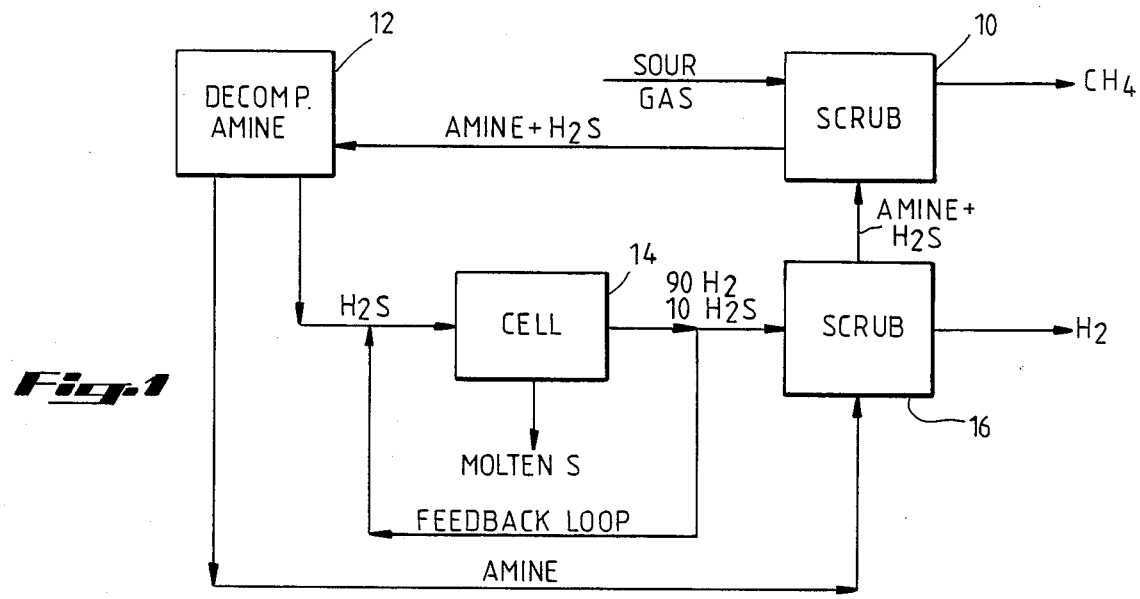
FIG. 1 is a process diagram for the system of the invention.

FIG. 1 illustrates a typical process diagram in which the invention is integrated. Sour gas is introduced into selective amine scrubber 10, e.g., methyl diethanolamine, yielding $CH_4$, amine and $H_2S$. The $H_2S$+ amine combination 12 using heat, yielding $H_2S$ (with some $CO_2$). This $H_2S+CO_2$ combination is converted to hydrogen gas and free sulphur in the cell 14. This reaction is generally about 90% percent effective. The remaining $H_2S$ can be advantageously scrubbed with a fresh scrubber 16 which may also be used to scrub the sour gas as shown. $H_2S$ gas is then recycled to scrubber 10.

Figure 2:
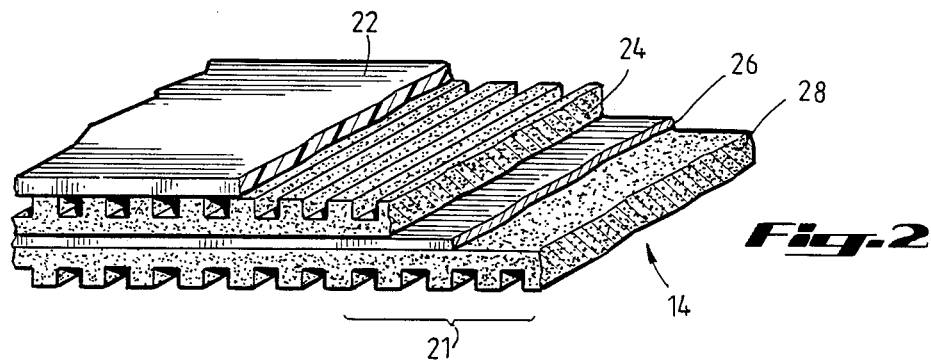
FIG. 2 illustrates a cross section of a general apparatus embodiment of the invention.

The cell 14 itself may be seen by reference to FIG. 2. In a preferred embodiment, the cell 14 is generally comprised of a graphite bipolar plate 22, a porous, ribbed graphite $S^{2-}$—$S$ anode 24, a polysulfide electrolyte disposed in a matrix 26, and a $H_2S$—$H_2$ cathode 28. Both the electrodes 24 and 28 are advantageously ribbed for correct reactant product distribution, although other structures such as waffles or structures in which coarse pores or fibers are used instead of ribs are also envisioned. The bipolar plate 22 which is preferably solid as shown, may exist as a separate or integral element of the aggregate cell 14. Unless multiple cells are used, a monopolar, electrically conductive plate may be substituted for the bipolar plate 22.

The cathode 28 preferably consists of porous nickel alloyed with chromium. The cathode may also be comprised of sintered nickel or graphite. Alternatively, an unalloyed nickel or cobalt cathode may be used. Since such materials become specifically sulfided, however, other sulfide materials impregnated in porous graphite can provide yet another material for use in the cathode. The anode 24 is preferably composed of a graphite felt. Alternatively, other sulfur-resistant, porous or sponge like materials may be used.

Though a sodium polysulfide electrolyte is preferred, other alkali metal polysulfides, e.g. potassium or lithium compounds or their mixtures, may be used in the matrix 26. Therefore, the electrolyte may be alternatively comprised of mixed sodium hydrogen polysulfides as determined by the thermodynamics corresponding to the local gas composition and electrode potential.

The system is preferably arranged so that the mean pore size in the matrix 26 is less than that in the anode 24 to ensure the most effective electrolyte distribution, the cathode 28 being partially filled only to give a large gas-electrolyte-catalyst interface. In preferred embodiments, component mean pore size is in the order of 5 microns at the anode 24, 0.3 microns for the electrolyte matrix 26 and 2 microns for the cathode 28.

As noted, both electrodes 24 and 28 preferably are provided with a ribbed structure such as to allow ready and even access of the hydrogen sulfide gas (in the case of the cathode 28) and ready and rapid removal of the molten sulfur (in the case of the anode 24). When the cells are stacked one cell on top of another, electrical contact between the cells is brought about by placing the bipolar graphite plate 22 in contact with the positive electrode 24 of one cell at one side of the plate, and electrical contact on the other side of the bipolar plate with the negative electrode 28 of the next cell. To assure electrical contact through the cell, the cell components are preferably compressed between the bipolar end plates 22 to at least 50 psi.

As shown in FIG. 2, both the anode 24 and cathode 28 are situated such that the ribbing 21 in both plates is parallel. In alternate embodiments, this ribbing may be situated at right angles between the anode 24 and cathode 28 such as to provide cross flow manifolding. Such cross flow manifolding is generally seen in FIG. 3 which represents a simplified embodiment of an operating unit 80 in which the cells of the present apparatus might be situated.

Figure 3:
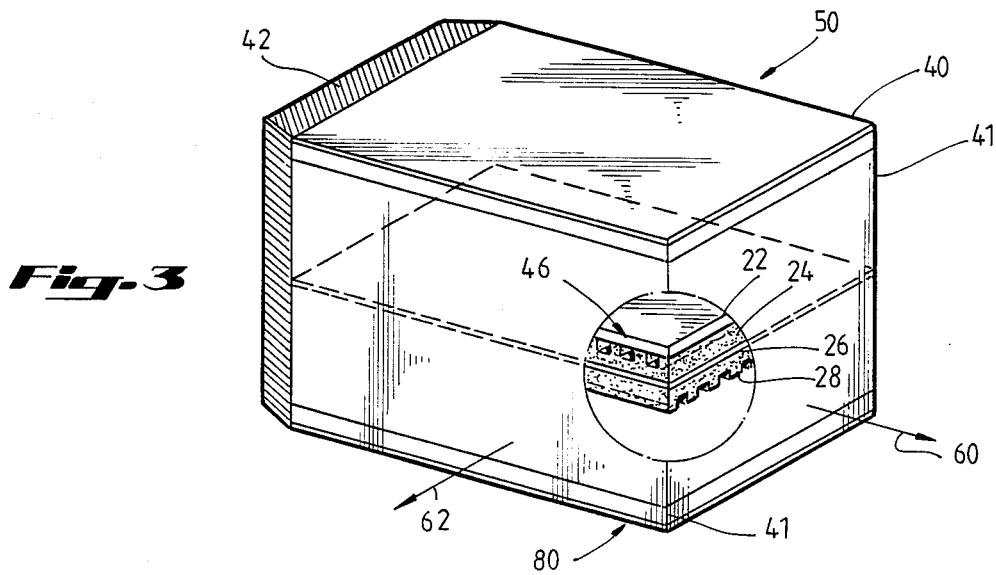
FIG. 3 illustrates an isometric, cutaway view of a simplified embodiment of a structured arrangement in which the invention might be utilized.

Referring to FIG. 3, the operative cell array 46 is generally arranged as earlier described in association with FIG. 2. The electrolytic cells are stacked one on top of another in a sandwich fashion, with the ribbing of the cathode 28 arranged parallel to the intake manifold 42 such as to be receivable to $H_2S$ gas flow. The cell array 46 is bounded at the top and the bottom by an end plate 40 to which are connected electrical leads (not shown) to initiate the desired reaction. These end plates 40 may be graphite or a corrosion resistant metal such as stainless steel. The cell array 46 is enclosed and sealed in a corrosion resistant container or housing 42, such as stainless steel, to prevent extant $H_2S$ from "bypassing" the cell array 46. This sealing may be accomplished by use of suitable gaskets, cementing, etc.

The present system is operative at elevated temperatures in the range of 285°–400° in order to ensure the molten nature of the electrolyte. Once the cell array 46 has been heated to the critical temperature range such that the electrolyte exists in a molten state, hydrogen sulfide gas is fed into the negative electrode 28 through gas intake manifold 42 such that $H_2S$ gas is evenly dispersed over the ribbed or waffled surface of the cathode 28, where the following chemical reaction will take place yielding hydrogen gas and sulfide ions:

$$H_2S + 2e^- \rightarrow H_2 + S^=$$

$H_2S$ gas is passed over the cathode 28 in a direction parallel to the plane of the cathode, resulting in a free hydrogen component as shown. The hydrogen component is collected in a direction parallel to the ribbing of the cathode as illustrated by arrow 60 in FIG. 3. The sulfide ions will then be transported across the molten polysulfide electrolyte layer to the surface of the positive electrode 24 where another electrochemical reaction takes place, $$S^= \rightarrow S + 2e^-,$$

yielding molten, elemental sulfur. The molten polysulfide electrolyte does not wet the graphite positive electrode 24. Therefore, as soon as the molten sulfur (which wets graphite) is formed at the electrode 24, it will be transported through the porous graphite electrode material by means of a "wicking" action. The continuous "wicking" of the molten sulfur will eventually give rise to streams of material flowing along the ribbed structure of the positive electrode 24, where it can be collected by a manifolding system (not shown) connected to each positive electrode structure.

By its very design and the utilization of selected components, the present invention prevents cross contamination from occurring between the collection of free hydrogen gas and elemental sulphur. When $H_2S$ gas is introduced through the cathode 28, sulphur ions are pulled through the cathode and further through the matrix 26 containing the molten electrolyte, where they are then transformed into elemental sulphur. Since the matrix 26 containing the polysulfide electrolyte is insoluble to elemental sulfur, this free sulphur cannot seep back to the cathode 28, instead being channeled to collecting manifolds 62 as above-described.

It is appreciated that a single "pass" or exposure of the pure $H_2S$ gas over the aforedescribed cathode surface 28 may not give rise to a complete decomposition of all the hydrogen sulfide gas. Hence, the gas stream exiting from the negative electrode structure may contain 10% hydrogen sulfide along with 90% gaseous hydrogen. Therefore and as illustrated in FIG. 1, it may be necessary to scrub this gas mixture in order to remove the undecomposed hydrogen sulfide which will be returned to the original hydrogen sulfide gas stream being fed to the electrolysis cell.

In operation, the cell array normally utilizes an average current density (A/geometric cm$^2$) preferably between 100 mA/cm$^2$ and 200 mA/cm$^2$. This current density, however, will vary according to the local gas composition in the cell as the reaction is "forced" by the application of the current. Operation below 100 mA/cm$^2$ is probably not feasible, since a high surface area will be required, resulting in high capital costs. Operation above 200 mA/cm$^2$ probably utilizes too great a voltage (which should preferably be in the range of 0.3 V), thus resulting in higher operating costs.

$H_2S$ gas flow rate of the present system is adjusted so that the number of coulombs passed as the gas traverses the cell corresponds to a 90% conversion of $H_2S$ gas to $H_2$ (96,500 coulombs corresponds to the formation of one equivalent, or about 1.008 g of hydrogen.) Operational pressure of the present system is variable. A correctly sealed system is operable at atmospheric or para-atmospheric pressures.

The following example will serve to illustrate the invention but it is not to be construed as limiting the invention.

EXAMPLE

Referring to FIG. 3, in one operating example a cell array 46 was constructed of 100 cells, where 5 cells were stacked per vertical inch. This array 46 was coupled to a natural gas well averaging 100,000 ft$^3$/day of a gas with constituent components in the order of 90% $CH_4$ and 10% $H_2S$. The stack was operated at 150 mA/cm$^2$ at normal temperatures and pressures (25° C. and 1 atmosphere) to yield components in the order of 15.7 kg S/hr and 11 m$^3$/hr free hydrogen.

What is claimed is:

1. An electrochemical cell for the electrolysis of elemental sulfur and hydrogen gas from gaseous $H_2S$, comprising:
    a molten sulfide electrolyte disposed in a porous matrix where said electrolyte is elevated to a temperature in the range of 285°–400° C., said matrix positioned between and in electrical contact with a porous anode and a porous cathode, the combination anode, matrix and cathode together being bounded by an electrically conductive plate.

2. The electrochemical cell of claim 1 where the conductive plate may exist as a separate or integral element of the combination anode, matrix and cathode.

3. The electrochemical cell of claim 2 where the conductive plate is comprised of graphite.

4. The electrochemical cell of claim 1 where the anode is ribbed or waffled.

5. The electrochemical cell of claim 4 where the anode is comprised of graphite felt.

6. The electrochemical cell of claim 1 where the matrix comprises lithium aluminate.

7. The electrochemical cell of claim 1 where the mean pore size of the matrix is less than the mean pore size of the anode.

8. The electrochemical cell of claim 1 where the cathode is comprised of a ribbed or waffled material.

9. The electrochemical cell of claim 8 where the cathode is comprised of porous nickel alloyed with chromium.

10. The electrochemical cell of claim 8 where the cathode is comprised of nickel or cobalt.

11. The electrochemical cell of claim 8 where the cathode is comprised of transition metal sulfide materials.

12. The electrochemical cell of claim 8 where the cathode is comprised of sulfide materials impregnated in porous graphite.

13. The electrochemical cell of claim 8 where the cathode is comprised of sintered nickel or graphite.

14. The electrochemical cell of claim 1 where the electrolyte is comprised of an alkali polysulfide or mixtures of such polysulfides.

15. The electrochemical cell of claim 14 where the electrolyte is comprised of a sodium polysulfide containing hydrogen sulfide.

16. A method for refining elemental sulphur and hydrogen gas from gaseous $H_2S$ adapted for use in an electrochemical cell comprising a molten electrolyte disposed in a porous matrix where said electrolyte is elevated to a temperature in the range of 285°–400° C., said matrix positioned between, and in electrical contact with, a porous anode and a porous cathode, where the combination anode, matrix, and cathode is bounded by a bipolar plate, said method comprising passing hydrogen sulfide gas through the cathode into the electrolyte while applying an electrical potential across the anode and cathode to form hydrogen ions at the cathode and form sulfide ions at the anode.

17. The method of claim 16 where the bipolar plate consists of graphite.

18. The method of claim 16 where the anode is ribbed or waffled.

19. The method of claim 18 where the anode is comprised of graphite felt.

20. The method of claim 16 where the matrix consists of lithium aluminate.

21. The method of claim 16 where the mean pore size of the matrix is less than the mean pore size of the anode.

22. The method of claim 16 where the electrolyte is comprised of a sodium polysulfide containing hydrogen sulfide.

23. The method of claim 16 where the cathode is comprised of a ribbed or waffled material.

24. The method of claim 23 where the cathode is comprised of porous nickel alloyed with chromium.

25. An electrochemical cell for the electrolysis of elemental sulphur and hydrogen gas from gaseous $H_2S$, comprising in combination, a matrix disposed between a porous anode and a porous cathode, said matrix containing a molten polysulfide electrolyte heated to a temperature of 285°–400° C.;

a graphite plate bounding, and in electrical contact with the anode and the cathode.

26. The electrochemical cell of claim 25 where said cathode is comprised of a ribbed or waffled material.

27. The electrochemical cell of claim 25 where said cathode is comprised of one or more of a group consisting of porous nickel alloyed with chromium, nickel, cobalt or graphite.

28. A method of electrolyzing hydrogen sulfide to form hydrogen and sulfur, comprising:

saturating a porous matrix with a molten polysulfide electrolyte, where said electrolyte is elevated to a temperature in the range of 285°–400° C.;

contacting the molten electrolyte with a porous anode and a porous cathode to form an electrolytic cell;

passing hydrogen sulfide gas through the porous cathode into the electrolyte while applying an electrical potential across the anode and cathode to form hydrogen from the hydrogen ions at the cathode and to form sulfur from the sulfide ions at the anode; and withdrawing hydrogen from the cathode and sulfur from the anode.

29. The method of claim 28 wherein the matrix is comprised of lithium aluminate.

30. The method of claim 28 wherein the anode or the cathode consist of a ribbed or a waffled material.

* * * * *